Jan. 1, 1952
A. J. BATTEY
2,581,229
HIGH-TEMPERATURE QUICK-ACTION THERMOCOUPLE
Filed March 8, 1949
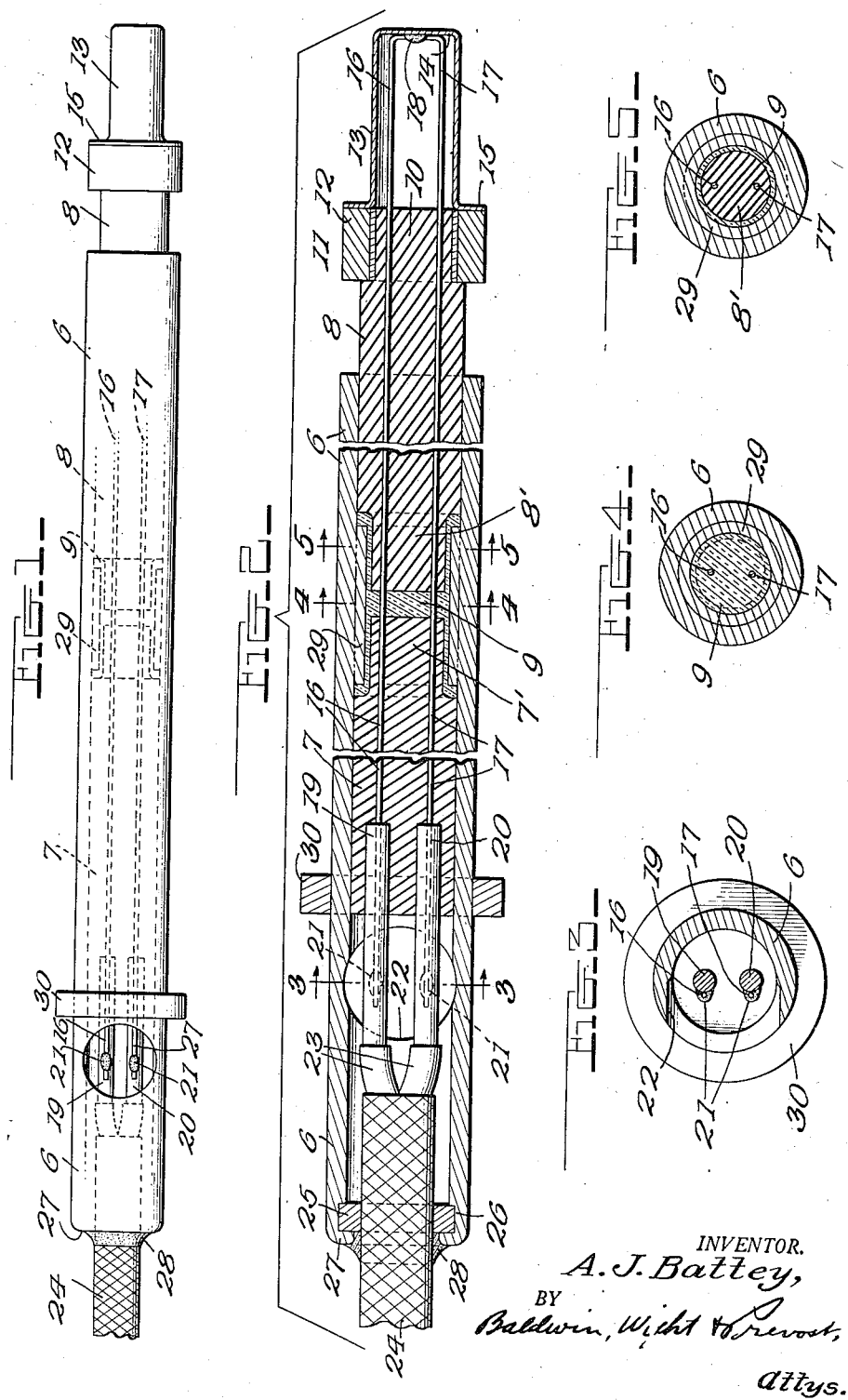
INVENTOR.
*A. J. Battey,*
BY
*Baldwin, Wight & Prevost,*
*attys.*

Patented Jan. 1, 1952

2,581,229

UNITED STATES PATENT OFFICE 2,581,229

HIGH-TEMPERATURE QUICK ACTION THERMOCOUPLE

Alexander J. Battey, Skaneateles, N. Y., assignor to Auburn Spark Plug Co., Incorporated, Auburn, N. Y., a corporation of New York Application March 8, 1949, Serial No. 80,237

2 Claims. (Cl. 136—4)

My invention consists in new and useful improvements in a high temperature, quick action thermocouple and has for its object to provide a device of this character which is particularly adapted for use in connection with the temperature control of jet engines, gas turbines, and the like.

In power plants of this nature, the gases are normally considerably hotter than the surrounding walls, ranging up to 2000° F., so that radiation from the sensing instrument to the walls may cause considerable error. Heretofore various methods have been developed for insulating and shielding the sensing element and the thermo-elements by enclosing them in coaxial tubes but due to the large size necessary and the attendant problems of installation, the undesirable disturbance of gas flow, and the slow response to sudden changes in gas temperature, these methods have generally not been satisfactory.

It is therefore an object of the present invention to overcome these disadvantages and to provide an effective shielding for the sensing element, composed of a high melting point precious metal directly secured to the junction of the base metal thermo-elements, and completely insulated from the body of the thermocouple.

Another disadvantage noted in most conventional thermocouples, results from ineffective sealing of the assembly. The majority of thermocouples are sealed with a ceramic material having an organic binder and, due to the high temperatures encountered in power plants such as those for which my thermocouple is designed, the organic binder of the thermocouple has a tendency to burn out, thus permitting hot gases to escape through the couple body. The thermocouple thus becomes inoperative as the thermo-elements become loose and are likely to fall out of the assembly; the hot gases flowing through the couple body will burn low melting point materials in the couple; and the instrument will not accurately indicate the temperature being controlled.

It is therefore another object of my invention to provide a thermocouple which is adequately sealed against leakage and to this end I have developed a novel method of assembling and sealing the various parts of the structure so as to positively prevent the passage of gases therethrough.

A further object of my invention is to provide a thermocouple so constructed as to indicate only the temperature absorbed by the sensing element and its protecting shield, as distinguished from known structures which are inclined to indicate any temperature by radiation or any temperature which it can "see" within the zone to be indicated.

A still further object of this invention is to provide an instrument in which the wires or thermo-elements are of small diameter in order to reduce the volume of material and to facilitate rapid temperature indication, while at the same time affording protection against rough usage. As previously pointed out, conventional thermocouples for this type of equipment usually employ large wires in order to withstand careless handling but as a result, these devices are slow acting and not satisfactory.

A still further object of my invention is to provide a thermocouple wherein the thermo-elements are connected to their respective lead wires at a point within the protecting housing, as distinguished from conventional thermocouples wherein such connections are disposed outside of the protecting body and are likely to become broken quickly even with normal use.

With the above and other objects in view which will appear as the description proceeds, my invention consists in the novel features herein set forth, illustrated in the accompanying drawings and more particularly pointed out in the appended claims.

Referring to the drawings in which numerals of like character designate similar parts throughout the several views:

Figure 1 is a view in side elevation showing my complete thermocouple assembly with certain internal portions thereof indicated in dotted lines;

Figure 2 is an enlarged longitudinal section of the structure shown in Figure 1, broken away at points to conserve space;

Figure 3 is a transverse sectional view taken on line 3—3 of Figure 2, showing the means for securing the lead wires to respective thermo-elements;

Figure 4 is a similar section taken on line 4—4 of Figure 2, through the intermediate sealing medium; and Figure 5 is a transverse section taken on line 5—5 of Figure 2.

In the drawings, referring to Figure 2, 6 represents an elongated cylindrical housing preferably composed of inconel or other suitable metal, which is adapted to protect and support the thermocouple in the wall (not shown), surrounding the temperature zone to be indicated. It may be stated that the composition of inconel is as follows: nickel 75.00% min., copper .50% max., iron 9.00% max., manganese 1.00 to 1.25%, silicon .40 to .50%, carbon .15% max., and chromium 10.00 to 15.00%. Within the housing 6, I provide a pair of coaxial insulators 7 and 8 which are composed of any suitable insulating material such as porcelain or the like, said insulators being reduced at their adjacent ends 7' and 8' respectively, and longitudinally spaced from one another at substantially the central portion of the housing 6. The adjacent ends of the insulators 7 and 8 are sealed as at 9 against leakage, by a method which will be hereinafter explained in detail.

The inner end of the innermost insulator 8 projects longitudinally beyond the extremity of the housing 6, within the temperature zone to be indicated and is reduced in diameter as at 10, to receive a malleable metal bushing 11 over which a malleable metal collar 12 is adapted to fit. A nose 13, substantially in the form of an elongated thimble, closed at its inner end 14, is welded to the adjacent face of the collar 12 by means of a radial flange 15. This nose 13 may be composed of platinum, gold, silver, or other suitable high melting point metal, preferably of a thickness of from .002 to .004 inch, thus providing a nose of large area but small volume which will rapidly reach the temperature of the zone within which it is placed.

The insulators 7 and 8 are provided with a pair of transversely spaced, longitudinally extending passageways of just sufficient diameter to receive a corresponding pair of longitudinally extending, small diameter thermo-elements 16 and 17, the inner ends of which project beyond the extremities of the inner insulator 8, into the nose 13. Here the respective inner ends of the thermo-elements are turned inwardly and are directly welded at 18, to the inner surface of the end 14 of the nose 13.

The outermost insulator 7 terminates at a point spaced inwardly from the outer longitudinal extremity of the housing 6, and the adjacent ends of the thermo-elements 16 and 17 project through this insulator into the cylindrical space at the head of the housing. Preferably, at this end of the insulator 7, the passageways for receiving the thermo-elements 16 and 17 are enlarged to receive the uncovered inner ends of respective lead wires 19 and 20, to facilitate the joining of the lead wires and thermo-elements. This is accomplished, as will be seen from Fig. 3, by longitudinally overlapping the respective thermo-elements and lead wires and welding them together as at 21.

This operation may be facilitated by providing a radial opening 22 in the wall of the housing 6, adjacent the point where the wires and thermo-elements are to be welded. In the drawing, I have shown only one such opening in the wall of the housing but it will be understood that if desired, a pair of oppositely disposed openings may be employed.

The lead wires 19 and 20 are of conventional form, having individual inner covers 23 and a common protecting casing 24. In my improved structure the encased lead wires are encircled by a metal disc or collar 25, which fits within an annular recess 26 in the end of the housing 6, and the outer extremity of the housing is crimped thereover as at 27, thus retaining the collar 25 in close engagement with the shoulder formed by the recess 26. The end of the housing is then sealed against the lead wire casing 24 by applying solder at 28, thus forming a strong connection for the lead wire at the point where it emerges from the housing 6 and preventing undue strain at the points of connection between the lead wires 19, 20, and the thermo-elements 16, 17.

Returning now to the sealing of the spaced adjacent ends 7', 8', of the insulators 7 and 8, I preferably employ a pellet of high temperature glass or calcined clay and glass, or similar insulating material of a predetermined volumetric quantity, which is interposed between the spaced ends of the insulators 7 and 8 within the housing 6. When heated and subjected to pressure by forcing the two insulators together longitudinally, the glass is caused to flow into all void spaces around the exposed thermo-elements 16 and 17 and around the reduced ends 7', 8' of the insulators and the walls of the housing 6. If desired, the inner face of the housing 6 may be inwardly enlarged as at 29, adjacent the reduced ends 7' and 8' of the insulators, to provide an annular ridge which further strengthens the junction at the point of sealing.

In order to aid in properly locating the nose 13 of the thermocouple at the point where the temperature is to be taken, an external collar 30 is copper-brazed to the housing 6 at a suitable point on its outer periphery, which limits the inward position of the assembly when it is installed.

Having thus described the structural parts of my improved thermocouple, I will describe the preferred method of assembly. The ends of the small thermo-elements 16 and 17 are first welded at 18 to the end 14 within the nose 13. The nose 13 is then welded to the malleable collar 12 by the flanges 15, after which the malleable metal bushing 11 is slid into position within the collar 12. This complete assembly is then placed over the reduced end 10 of the insulator 8, after the thermo-elements 16 and 17 have been threaded through their respective passageways in the insulator. The assembly is then placed in an electrical fixture (not shown) where the collar 12 is heated by resistance to a malleable state, and by a swaging operation the metal of the collar 12 is caused to flow inwardly over the surface of the malleable bushing 11 which, in turn, grips the reduced end 10 of the insulator 8. As the metal parts cool by contraction, they form a molded union of metal and porcelain which is non-removable.

Next, the lower assembly just described is inserted in the inner end of the housing 6 and placed in a fixture with any suitable spacer (not shown), to properly locate the collar 12 with respect to the inner end of the housing 6. A pellet of glass or calcined clay and glass of the correct volumetric quantity, is placed in the housing 6 on top of the reduced end 8' of the insulator 8 and around the thermo-elements 16 and 17. The outer insulator 7 is then lowered into the housing 6 and on top of the glass pellet. Incidentally, the adjacent ends 7', 8' of the insulators are at this point, considerably further apart than shown in the drawing. The entire assembly, with the component parts in the positions noted above, is now heated to a temperature which will cause the glass pellet to flow, usually a temperature of 1700° F. The insulator 7 is forced into this molten glass, causing the glass to flow at 9 into all void spaces within the housing 6 and around the thermo-elements 16 and 17, and the insulator 7 comes to rest a given distance from the insulator 8, determined by the volume of the initial glass pellet.

The thermo-elements 16 and 17 pass out of the insulator 7 into the cylindrical space at the head of the housing 6. The respective lead wires 19 and 20, having had their inner covers 23 removed at their ends, are then inserted in the enlarged openings in the insulator 7 with the respective thermo-elements 16 and 17 in overlapping relation thereto, the retaining collar 25, having been slipped in place over the protecting casing 24. The overlapping thermo-elements and lead wires are then soldered or welded at 21, through the opening 22 in the housing, after which the end of the housing is crimped at 27 against the collar 25 and solder 28 is applied at this joint.

It will thus be seen that I have provided a well insulated and sealed thermocouple and one which will withstand considerably hard usage. The insulator 8 insulates the metal nose 13 from the metal body 6 at the space provided between the collar 12 and the housing. Those portions of the thermo-elements passing between the two insulators are held rigidly in place in the insulating glass 9 and the second insulator 7 is separated from the former by the glass which also rigidly secures it in place. This glass seal provides an assembly having a maximum tightness against leakage of compression.

From the foregoing, it is believed that my invention may be readily understood by those skilled in the art, without further description, it being borne in mind that numerous changes may be made in the details of structure without departing from the spirit of the invention as set forth in the following claims.

I claim:

1. A thermocouple for gas turbines and the like, comprising a pair of parallel spaced thermocouple wires of fragilely small diameter, joined at one end to form a projected sensing element, the respective opposite ends of said wires forming lead wire coupling terminals, an insulator unit separating and surrounding said thermocouple wires between said sensing element and the coupling terminals, a closed hollow shielding nose of thin gauge, high melting point metal, sealed to and projecting from the adjacent end of said insulator unit, and enclosing said sensing element with the junction of said wires welded to the inner surface of its projecting end, said nose being of relatively large area with respect to the diameter of said thermocouple wires to provide a large nose of small metallic volume, a tubular metallic protecting housing enclosing said insulator unit from a point spaced longitudinally from that end of the unit supporting the nose and sensing element, to form a rearwardly extending annular gap for thermally isolating the nose and sensing element from the corresponding end of the housing, the opposite end of said housing extending longitudinally beyond the insulator unit to form a coaxial hollow coupling chamber, closed at one end by said insulator unit, for receiving the coupling terminals of said thermocouple wires, an axial opening in the opposite end wall of said chamber, a pair of lead wires projecting through said opening into said chamber, said lead wires being welded to respective terminals at points within said chamber, at least one radial aperture in the side wall of said coupling chamber to facilitate the welding of said lead wires to the thermocouple wires, means sealing the insulator unit with respect to the housing and thermocouple wires, to provide a gas tight assembly, and means firmly securing said lead wires in the axial opening of said chamber to prevent relative movement.

2. A thermocouple as claimed in claim 1, wherein the projected end of said insulator unit is provided with an annular metallic collar permanently fixed thereto, in spaced relation to the adjacent end of said housing, the base of said nose being provided with a radial flange welded to said collar.

ALEXANDER J. BATTEY.

REFERENCES CITED

The following references are of record in the file of this patent:

UNITED STATES PATENTS

| Number | Name | Date |
|---|---|---|
| 2,186,707 | Ray | Jan. 9, 1940 |
| 2,223,408 | Dietert | Dec. 3, 1940 |
| 2,258,809 | Rabezzana | Oct. 14, 1941 |
| 2,368,937 | McGillin et al. | Feb. 6, 1945 |
| 2,374,377 | Percy | Apr. 24, 1945 |
| 2,445,159 | Tegge | July 13, 1948 |
| 2,466,175 | Kretsch et al. | Apr. 5, 1949 |

OTHER REFERENCES

Technologic Paper #170, page 27, Bureau of Standards, 1921.

Henriques, Jr., Review of Scientific Instruments, September 1947, page 678.